United States Patent [19]

Takata et al.

[11] Patent Number: 5,267,166

[45] Date of Patent: Nov. 30, 1993

[54] VEHICLE TRAVEL DIRECTION ESTIMATING DEVICE

[75] Inventors: Koji Takata; Tohru Nakaura, both of Itami, Japan

[73] Assignee: Sumitomo Electric Industries, Ltd., Osaka, Japan

[21] Appl. No.: 813,785

[22] Filed: Dec. 27, 1991

[30] Foreign Application Priority Data

Dec. 27, 1990 [JP] Japan .................................. 2-407909

[51] Int. Cl.$^5$ .............................................. B60T 8/32
[52] U.S. Cl. ............................. 364/449; 364/426.02; 303/103
[58] Field of Search ............... 364/443, 449, 453, 454, 364/457, 426.02; 73/178 R; 340/988; 303/95, 103

[56] References Cited

U.S. PATENT DOCUMENTS

| | | |
|---|---|---|
| 4,758,959 | 7/1988 | Thoone et al. .................... 364/454 |
| 5,058,023 | 10/1991 | Kozikaro .......................... 364/449 |
| 5,122,960 | 6/1992 | OOka ................................ 364/449 |

Primary Examiner—Gary Chin
Attorney, Agent, or Firm—Sandler Greenblum & Bernstein

[57] ABSTRACT

A vehicle travel direction estimating device is provided which has a wheel speed calculating device for calculating the speed and acceleration Aw of a vehicle. In addition, a gravity-type accelerometer is provided for producing a gravitationally detected acceleration Am. When both Aw and Am increase or decrease simultaneously, it is determined that the vehicle is travelling forward, and when one of Aw and Am increases while the other decreases, it is determined that the vehicle is travelling in reverse. To detect this feature, a calculating system is provided to form differential values Daw and Dam from accelerations Aw and Am. The vehicle travel direction is estimated using the differential values Daw and Dam.

35 Claims, 5 Drawing Sheets

VEHICLE TRAVEL DIRECTION ESTIMATING DEVICE

BACKGROUND OF THE INVENTION

1. Field of the Invention

The present invention relates to a device which calculates the estimated vehicle speed of a vehicle for use in wheel behavior control, including antilock brake control, and more particularly, to a device for estimating the direction of travel of the vehicle based on the output of a wheel speed determination device and a gravity-type accelerometer.

2. Description of the Prior Art

Antilocks brake control devices and other wheel behavior control devices base their control on estimated values such as the extent of wheel slippage or spinning based on a calculated vehicle speed, and estimate the coefficient of friction between a tire and the road surface. The coefficient of friction between the tire and road is normally estimated based on a estimated value of vehicle acceleration during control, and the vehicle acceleration is estimated based on the estimated vehicle speed. Therefore, the performance of the wheel behavior control device is greatly dependent upon the precision of vehicle speed estimation.

However, if the vehicle speed is estimated from the wheel speed alone, the estimating precision is reduced significantly when the tires slip or spin badly.

Therefore, if the vehicle speed and vehicle acceleration are estimated based on both the wheel speed and the acceleration obtained from a reliable accelerometer, the estimating precision can be significantly increased. A typical type of accelerometer is a gravity-type accelerometer.

As illustrated in FIG. 6, the gravity-type accelerometer detects acceleration by converting the displacement of a weight F caused by acceleration to an electrical signal using resistors, piezoelectric elements, differential transformers, and other devices. The gravity-type accelerometer measures an acceleration as a signed value, while the wheel speed speedometer usually measures a speed as an unsigned value, i.e. an absolute value.

Therefore, an estimated value of vehicle acceleration calculated in accordance with a wheel speed value produced wheel speed speedometers will not have the same sign as an acceleration value obtained from a gravity-type accelerometer, when the vehicle is travelling in a reverse direction. If the direction of vehicle travel is not identified by some means, it will not be possible to control wheel behavior when the vehicle travels in a reverse direction.

Although it is possible to use the sign (positive or negative) output by a gravity-type accelerometer, the sign may not be accurate, due to e.g., inaccuracies in installation of the accelerometer, electrical drift and gain changes, and other relatively long-term variations. Furthermore, it is also affected by the slope of a road where the vehicle is driven on. In these circumstances output the sign (polarity) cannot necessarily be used as the true sign of acceleration.

Therefore, when using a gravity-type accelerometer, it is extremely important to solve these problems, including the problem of the slope of the road. In the applicant's previously filed related application (Ser. No. 07/811,942) corresponding to Japanese Patent application H2-406743, a zero-point correction device for a gravity-type accelerometer is introduced. By the use of the zero-point correction device as disclosed in the related application, it is possible to estimate the sign of the true acceleration with a certain degree of reliability using the sign of the value output by the gravity-type accelerometer after zero-point correction.

In the above related application, however, the zero-point correction is carried out under the assumption that the direction of vehicle travel is correctly detected. If the zero-point correction is carried out based on a false assumption of the direction of vehicle travel, the correction will contribute to an unexpected result which is much worse than without correction.

Therefore, when a gravity-type accelerometer is used it is very important to correctly recognize the direction of vehicle travel.

SUMMARY OF THE INVENTION

The present invention has been developed with a view to substantially solving the above described disadvantages and has for its essential object to provide an improved vehicle travel direction estimating device.

In order to achieve the aforementioned object, according to the present invention a device is provided for estimating the travel direction of a vehicle wheel speed calculation means are provided for measuring a rotational velocity of a wheel and for producing an absolute value thereof as a wheel speed of at least one wheel of a vehicle at each operation cycle. Estimated vehicle acceleration calculation means calculate an estimated vehicle acceleration Aw estimated from the wheel speed, and a gravity-type accelerometer produces a gravitationally detected acceleration Am. First differentiating means are provided for differentiating the gravitationally detected acceleration Am and for producing a first differential value dAm. Second differentiating means are provided for differentiating the estimated vehicle acceleration Aw and for producing a second differential value dAw. Detection means detect the direction of the vehicle travel based on the first and second differential values dAm and dAw.

The differential dAw of the vehicle speed Aw, estimated from the wheel speed, and the differential dAm of the acceleration Am, obtained from the gravity-type accelerometer are plotted on a map having the differential of the vehicle acceleration estimated based on the wheel speed on the horizontal axis and the differential of the output from the gravity-type accelerometer on the vertical axis, and the direction of vehicle travel is determined to be forward when the values approach the +45° line and reverse when the values approach the −45° line.

A vehicle travel direction estimating device according to the present invention attempts to determine the direction of vehicle travel by a general evaluation of the behavior of the output of a gravity-type accelerometer and an estimated vehicle acceleration value which is produced based on the wheel speed.

BRIEF DESCRIPTION OF THE DRAWINGS

The present invention will become more fully understood from the detailed description given below and the accompanying diagrams, wherein.

DETAILED DESCRIPTION OF THE PREFERRED EMBODIMENTS

Before proceeding to the detailed description of the device, the principle of operation for this device is described first.

If a vertical axis of a graph represents an estimated vehicle acceleration value estimated from a value representing wheel speed and a signal output from a gravity-type accelerometer, while a horizontal axis represents time, the direction of vehicle travel is determined to be forward when the output of the accelerometer and the estimated vehicle acceleration show a change of vertically parallel movement to the horizontal axis, and is determined to be reverse when the change is vertically symmetrical to the horizontal axis. In other words, when both accelerations Aw and Am are increased or decreased simultaneously, the vehicle is determined to be travelling forward, and when one of the accelerations Aw and Am increases while the other one decreases the vehicle is determined to be travelling in reverse.

Of course, it is quite important to equalize the dynamic properties of the output of the accelerometer and the estimated vehicle acceleration, i.e. the mechanical and mathematical filtering delays of the two, because this is the basis of the comparison.

To evaluate the above characteristics, i.e. parallel or symmetrical, a map having a horizontal axis representing the differential value dAw of the estimated vehicle acceleration Aw based on the wheel speed and a vertical axis representing the differential value dAm of the output Am of the gravity-type accelerometer is prepared. In the map, the direction of vehicle travel is determined to be forward when a plotted point is near the +45° line and reverse when the same is near the −45° line.

Figure 3:
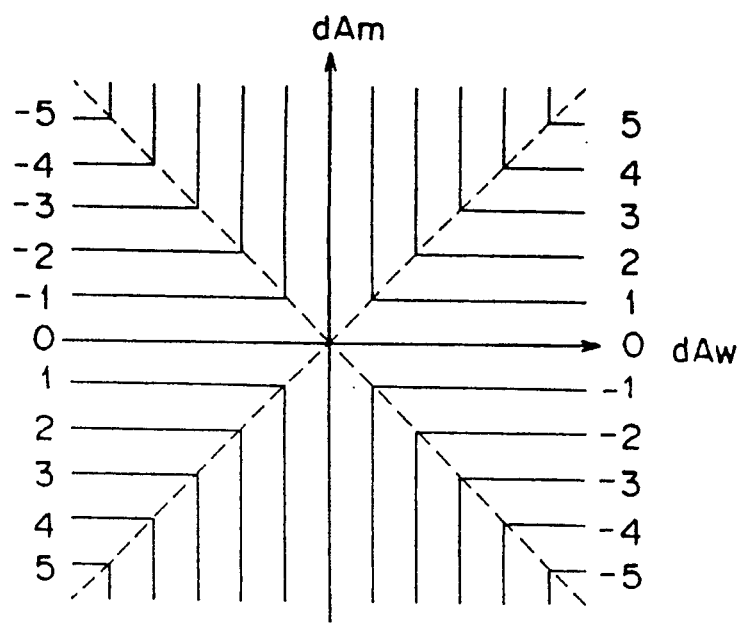
FIG. 3 illustrates a map of determination values used for determining the vehicle travel direction.
Figure 4:
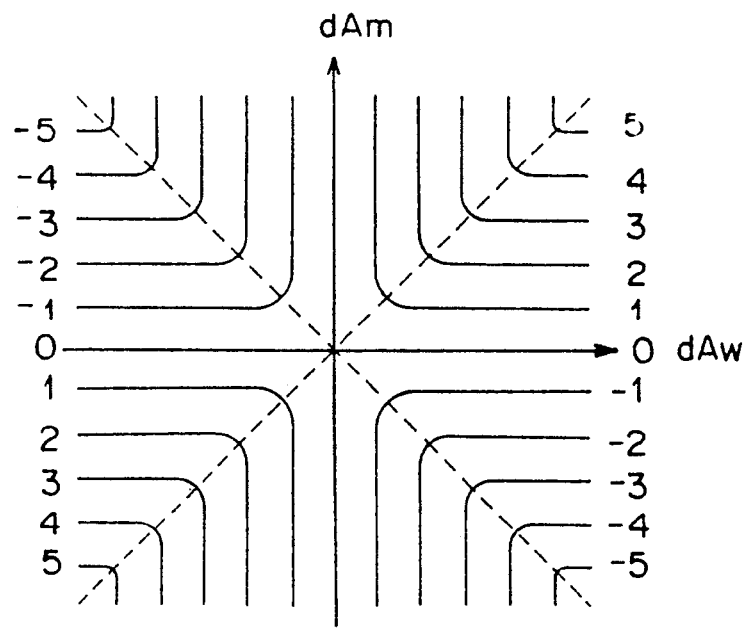
FIG. 4 illustrates an alternative example of the map in FIG. 3.
Figure 5:
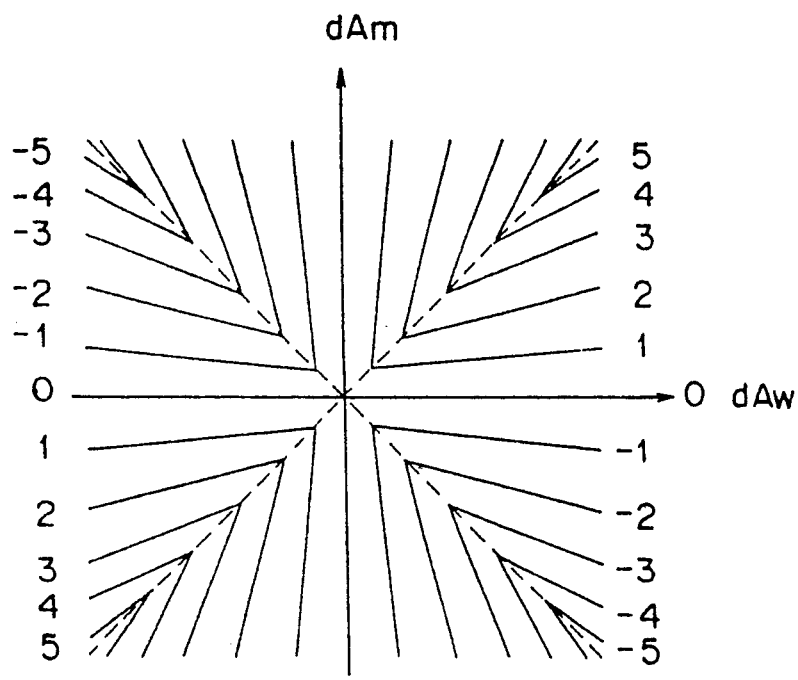
FIG. 5 is another alternative example of the map in FIG. 3.
Figure 6:
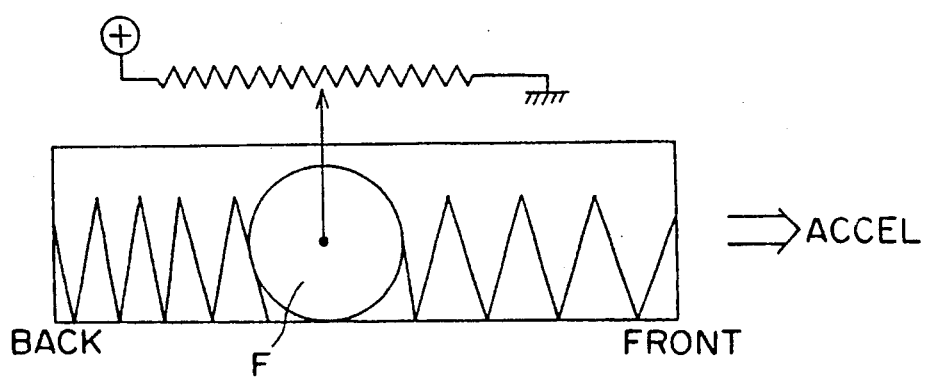
FIG. 6 is a simplified diagram of a gravity-type accelerometer.

Examples of such maps are shown in FIGS. 3, 4, and 5. It can be concluded that it is difficult to evaluate the traveling direction when a plotted point is near either of the vertical or horizontal axes. Therefore, the certainty of the forward or reverse direction of vehicle travel evaluation can be expressed by a function Z, which is represented by the contour lines on the maps. If the value Z corresponding to a contour line is used for determining the vehicle travel direction, the sign of Z represents the direction of vehicle travel and the absolute value of Z represents the degree of certainty of the determination.

The value Z may be given by a numeric table on the map, or may be calculated from a suitable function, $Z = f(x,y)$.

Several parameters can be defined as follows: Aw is the vehicle acceleration estimated from the wheel speed; Am is the acceleration output by the gravity-type accelerometer; Aof and Aob are the zero-point correction amount applied to the gravity-type accelerometer in the forward direction and in the reverse direction, respectively; Acf and Acb are the acceleration output by the gravity-type accelerometer after correction in the forward direction and in the reverse direction, respectively; and kf and kb are the speed of zero-point adjustment in the forward direction and in the reverse direction, respectively. In accordance with these parameters, the relationships $$Acf = Am - Aof \tag{1}$$

$$Aof = Aof + (Acf - Aw)*kf \tag{2}$$

can be defined in the forward direction, and $$Acb = -Am + Aob \tag{3}$$

$$Aob = Aob + (Aw - Acb)*kb \tag{4}$$

in the reverse direction. It is to be noted that in equations (2) and (4), $0 \leq k \leq 1$. The units of Ac, Am, Ao, and Aw are a product of the gravity acceleration and the unit operating cycle time. Thus, the differential operations are expressed as the amount of change during one operating cycle.

A corrected acceleration Ac is determined using equations (1) and (2) when a forward vehicle travel direction is evaluated, and using equations (3) and (4) when a reverse direction is evaluated.

It is to be noted that equations (5) and (6)

$$Acf = Am + Aof \tag{5}$$

$$Aof = Aof + (Aw - Acf)*kf \tag{6}$$

can be substituted for equations (1) and (2), and equations (7) and (8)

$$Acb = -Am - Aob \tag{7}$$

$$Aob = Aob - (Aw - Acb)*kb \tag{8}$$

can be substituted for equations (3) and (4).

Furthermore, sensitivity correction may also be applied in addition to the zero-point correction using equations $$Acf = (Am - Aof)*S$$

$$Aof = Aof + (Acf - Aw)*kf*a$$

$$S = S - (Acf - Aw)*kf*b$$

for the forward direction, etc.

If the value Z is expressed by a function, such a function may be expressed as follows:

$$Z = f(dAw, dAm) \tag{9}$$

One example of the function $f$ is $$f(x, y) = |x+y| - |x-y| \tag{10}$$

A map of the values obtained by this function is shown in FIG. 3. It should be further noted that the maps shown in FIGS. 4 and 5 can also be used.

Because Z is affected by noise and differences in the time constants of Aw and Am, it is preferable to use a filtered value Zf in place of the raw value Z, wherein the speed c of the filter is $(0<c<1)$. The filtered output Zf is defined by equation (11) as follows:

$$Zf = Zf + (Z - Zf) \cdot c \quad (11)$$

If c is chosen as a relatively small value, it will be more convenient to use a Zf value multiplied by 1/c as $$Zf = Zf \cdot (1-C) + Z \quad (11')$$

instead of (11). The extremity of c-0 in (11') is a simple integration.

When $Zf > 0$, direction of travel is determined to be forward, and when $Zf < 0$ it is assumed to be reverse. When $Zf < 0$, Acf is used, and when $Zf > 0$, Acb is used. When $Zf = 0$, either direction may be applied, but it is natural to assume the forward direction of travel.

Though the value Zf may be calculated at all operation cycles, the calculation may be stopped when the absolute value of Zf reaches a predetermined value and the value Zf at the time is stored in a memory until the vehicle speed becomes 0 (i.e., until the vehicle stops). Zf is reset to zero when the vehicle starts moving again to resume the calculation of Zf from the cleared state. During the period in which calculation of Zf is stopped, it is preferable to stop calculation of Ao for the opposite direction and substitute the value Ao for the same direction, because the vehicle travel direction is assumed to remain in the same direction even if the behavior of Aw and Am temporarily suggests the opposite direction of travel.

Specifically, calculation of Aob is stopped during the period in which Zf is fixed as $Zf > 0$, and during which period it is assumed that Aob=Aof; similarly, calculation of Aof is stopped during the period in which Zf is fixed as $Zf < 0$, and during which period it is assumed that Aof=Aob.

By taking this concept one step further, even if Zf is not fixed, it is also possible to normally calculate only one of the values Aof or Aob. Thus, when $$Zf \geq 0, Ac = Am - Ao \quad (1')$$
$$Ao = Ao + (Ac - Aw) \cdot k \quad (2')$$

are obtained and when $$Zf < 0, Ac = -Am + Ao = -(Am - Ao) \quad (3')$$

$$Ao = Ao + (Aw = Ac) \cdot k \quad (4')$$

are obtained.

Figure 1:
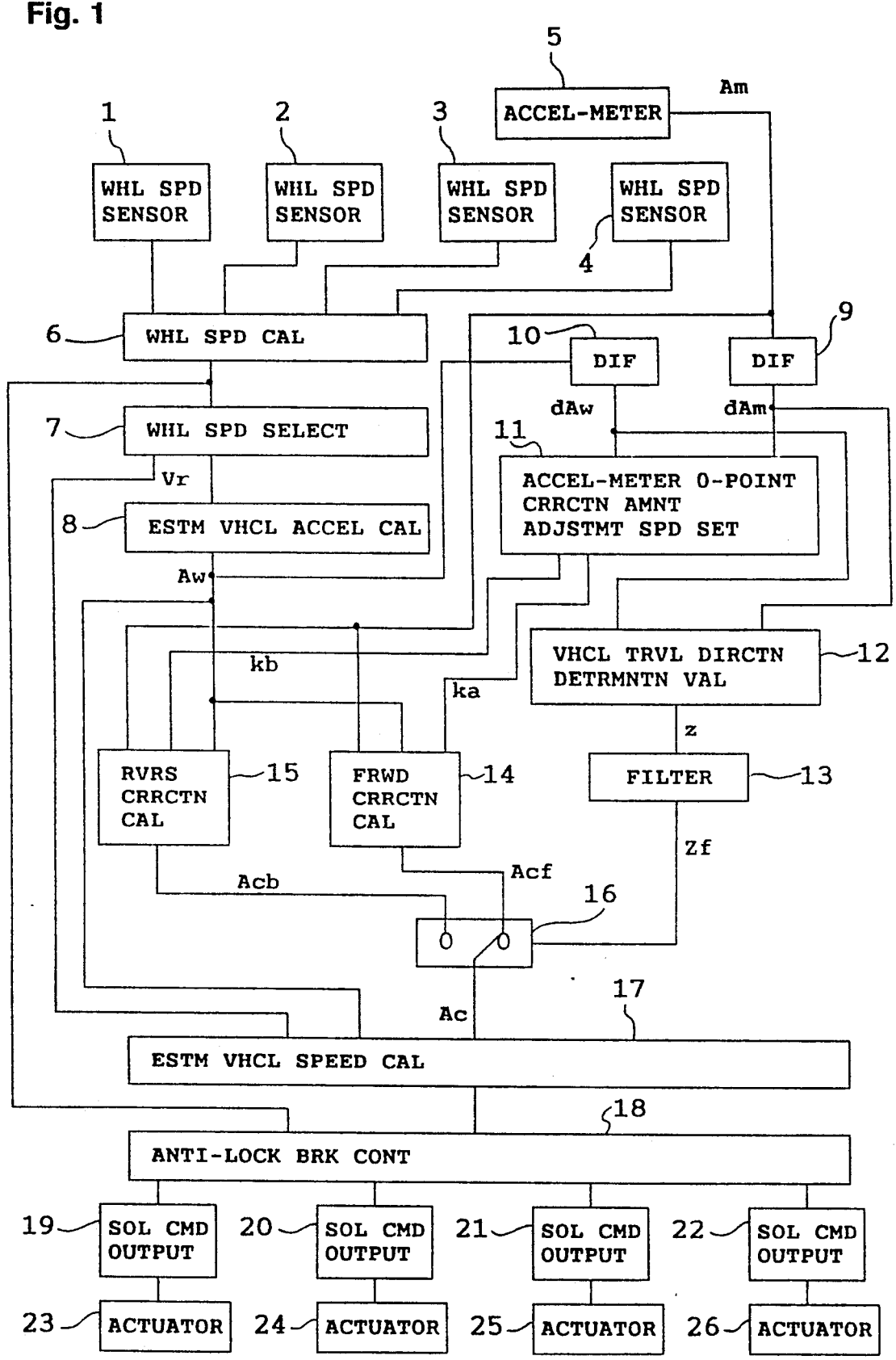
FIG. 1 is a block diagram of an antilock brake control device equipped with a vehicle travel direction estimating device according to the present invention.

Referring to FIG. 1, an antilock brake control device equipped with a vehicle travel direction estimating device according to the present invention is shown. The antilock brake control device comprises wheel speed sensors 1 to 4 to detect the rotation of the four wheels, a gravity-type accelerometer 5 which produces an acceleration output Am, a wheel speed calculator 6 to calculate the wheel speed of each of the four wheels based on the signals from the wheel speed sensors, a wheel speed selector 7 to select the maximum, minimum, or average wheel speed of the four wheels depending upon the conditions, and estimated vehicle acceleration calculation means 8 to calculate the estimated vehicle acceleration Aw based on the selected wheel speed.

The antilock brake control device further comprises a first differentiation circuit 9 which outputs the differential dAm of the output Am from the gravity-type accelerometer 5, and a second differentiation circuit 10 which outputs the differential dAw of the estimated vehicle acceleration based on the wheel speed. An accelerometer zero-point correction amount adjustment speed setting means 11 is provided to receive the differential values dAm and dAw and produces an adjustment speed k (delay time) of the correction amount used for the zero point correction of the gravity-type accelerometer. A vehicle travel direction determination value output device 12 also receives the differential values dAm and dAw and determines the vehicle travel direction determination value Z from differential values dAm and dAw, by reading from a table or a map such as shown in FIG. 3 or performing a calculation. A filter device 13 receives the vehicle travel direction determination value Z and removes noise which may be produced during the differential operation by using equation (11).

A forward correction calculation means 14 receives the estimated vehicle acceleration Aw estimated from the wheel speed, the acceleration output A, by the gravity-type accelerometer, and adjustment speed k, and calculates, using equations (1) and (2) the acceleration Acf based on the corrected gravity-type accelerometer when the vehicle travel direction is forward. Similarly, a reverse correction calculation means 15 receives the parameters Aw, Am and kb, and calculates using equations (3) and (4) the acceleration Acb based on the corrected gravity-type accelerometer when the vehicle travel direction is reverse.

A selection means 16 selects the output Acf from the forward correction calculation means 14 or output Acb from the reverse correction calculation means 15 according to the travel direction indicated by the determination value Zf output from the filter device 13, and outputs the corrected acceleration Ac which is the corrected version of the acceleration obtained from the gravity-type accelerometer.

An estimated vehicle speed calculation means 17 is provided which calculates the estimated vehicle speed based on the wheel speed Vr from the wheel speed selector 7 and either one of the acceleration Ac based on the gravity-type accelerometer or the acceleration Aw obtained from the estimated vehicle acceleration calculation means 8. An antilock brake controller 18 detects wheel locking symptoms based on the wheel speed and estimated vehicle speed, and outputs an antilock brake control signal. Further provided are solenoid command output devices 19 to 22 which output signals to the solenoids in the actuators 23 to 26 for controlling the hydraulic brake pressure based on the antilock brake control signals.

Figure 2:
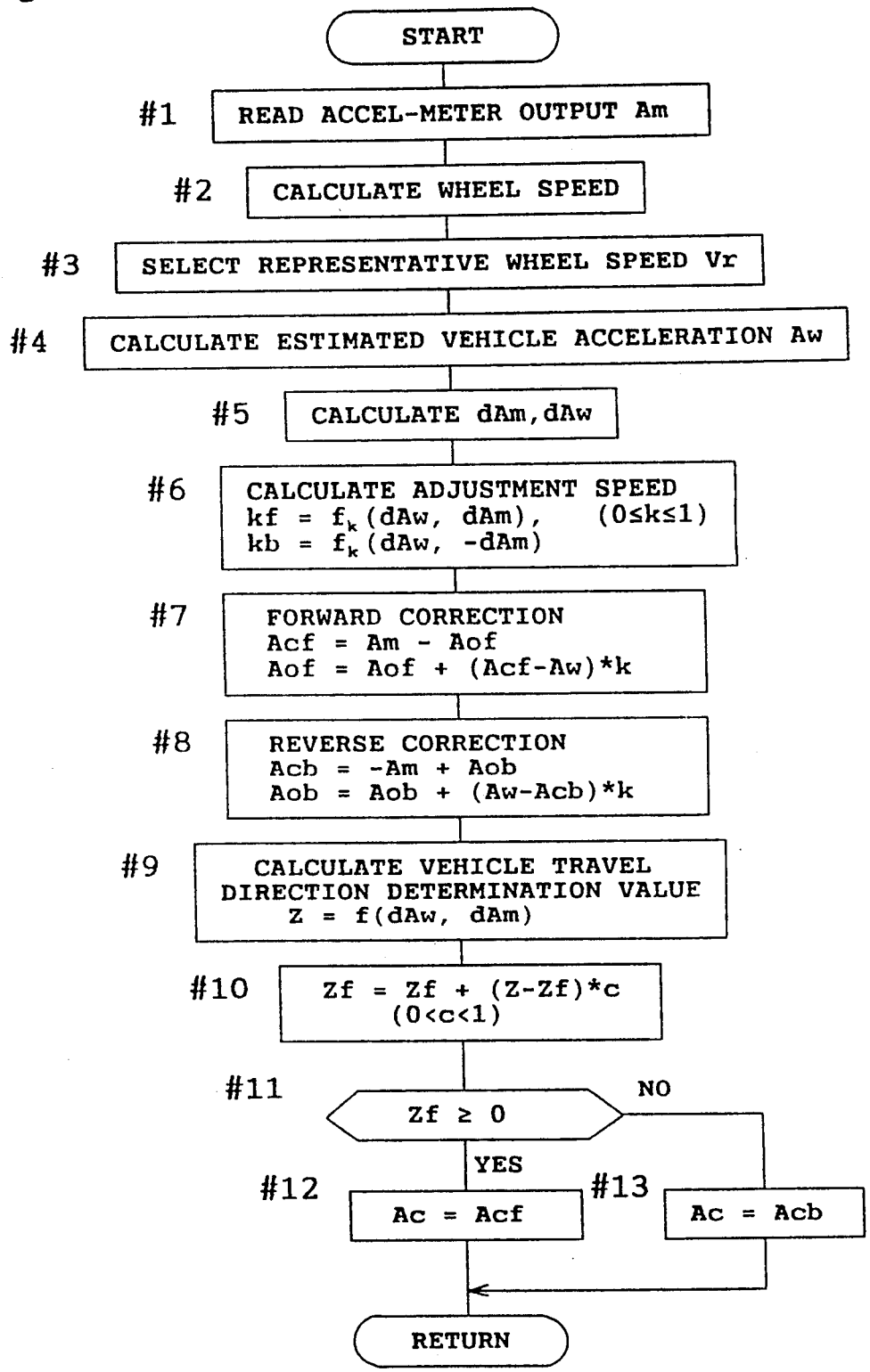
FIG. 2 is a flow chart illustrating the operation of the vehicle travel direction estimating device shown in FIG. 1.

The operation of the vehicle travel direction estimating device according to the present invention is described hereinbelow with reference to the flow chart shown in FIG. 2.

The output Am from the accelerometer is read at Step #1, and the wheel speed is calculated in Step #2 based on the outputs from the wheel speed sensors 1 to 4.

At Step #3, the representative wheel speed Vr is selected, and the estimated vehicle acceleration Aw is then calculated in Step #4.

At Step #5 the differentials dAm and dAw of the acceleration Am output by the gravity-type accelerometer 5 and the estimated vehicle acceleration Aw based on the wheel speed are obtained. In Step #6, the adjustment speed k is output using the obtained differential values dAm and dAw. The adjustment speed k is a value between 0 and 1, and is obtained in a manner described in the applicant's previously filed related application (serial No. is not yet received) corresponding to Japanese Patent application H2-406743.

In Step #7, a correction calculation is performed using equations (1) and (2) and the corrected acceleration Acf is calculated, based on the gravity-type accelerometer when the vehicle travel direction is forward, and at Step #8 the correction calculation is performed using equations (3) and (4). The corrected acceleration Acb is calculated, based on the gravity-type accelerometer, when the vehicle travel direction is reverse.

At Step #9, the determination value Z is output from a numeric table, or equation (10), which represents the map shown in FIG. 3 to determine the direction of vehicle travel using the differentials dAm and dAw. Because there are cases in which the determination value Z is affected by the noise signals, filtering is applied to remove such noise signals. The filtered determination value Zf is then output at Step #10.

At Step #11 it is determined whether the filtered determination value Zf is positive, zero, or negative. If positive or zero, the direction of vehicle travel is determined to be forward. In this case, the control procedure thus advances to Step #12 to select the forward vehicle acceleration Acf. If Zf is negative, the direction of vehicle travel is determined to be reverse. In this case, the procedure advances to Step #13 to select the reverse vehicle acceleration Acb. The selected acceleration is set as the corrected acceleration Ac of the gravity-type accelerometer.

Figure 7:
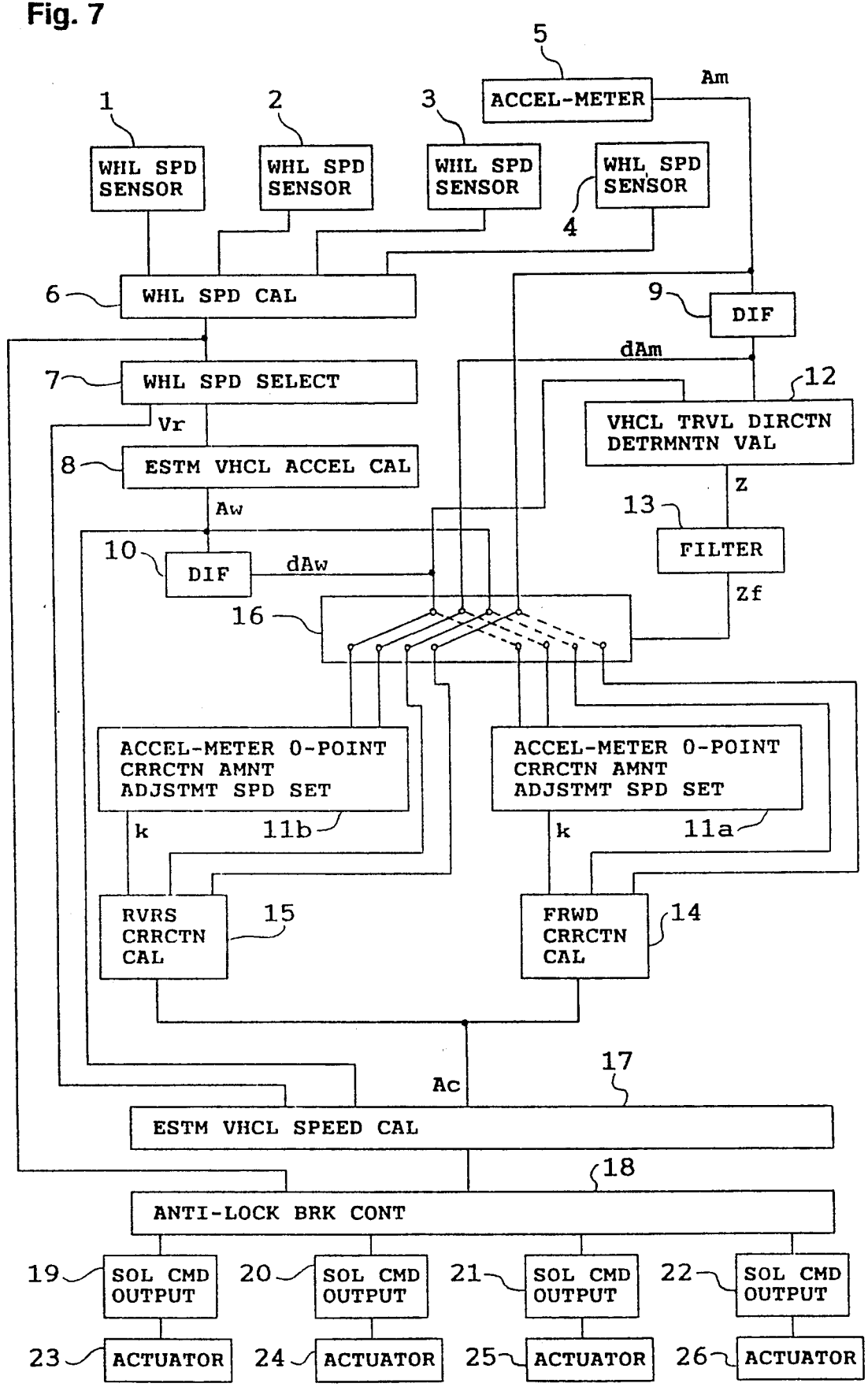
FIG. 7 is a block diagram similar to FIG. 1, but showing a modified antilock brake control device.

Referring to FIG. 7, a modification of the vehicle travel direction estimating device is shown. According to the device shown in FIG. 1, the forward correction calculation means 14 carries out the calculation of equations (1) and (2) and, at the same time, the reverse correction calculation means 15 carries out the calculation of equations (3) and (4), regardless of forward or reverse direction of the vehicle travel. When the vehicle is travelling forward as detected by the vehicle travel direction determination value output means 12, the selection means 16 is so operated as to select output Acf from the calculation means 14, and when the vehicle is travelling reverse, the selection means 16 is so operated as to select output Acb from the calculation means 15. However, according to the device shown in FIG. 7, the selection means 16 is provided before the accelerometer zero-point correction amount adjustment speed setting means 11. The selection means 16 receives parameters Aw, Am, dAw and dAm. When the vehicle is travelling forward as detected by the vehicle travel direction determination value output means 12, the selection means 16 is so operated as to supply the parameters dAw and dAm to accelerometer zero-point correction amount adjustment speed setting means 11a and the parameters Aw and Am to forward correction calculation means 14, and when the vehicle is travelling reverse, the selection means 16 supply the parameters dAw and dAm to accelerometer zero-point correction amount adjustment speed setting means 11b and the parameters Aw and Am to reverse correction calculation means 15. By the arrangement of FIG. 7, equations (1) and (2) are calculated when it is detected that the vehicle is travelling forward, and equations (3) and (4) are calculated when it is detected that the vehicle is travelling reverse.

As described herein, since the correct direction of vehicle travel can be determined by using the differential of the output of the gravity-type accelerometer and the differential of the estimated vehicle acceleration based on the wheel speed, a vehicle travel direction estimating device according to the present invention can obtain the correct vehicle travel direction even if the zero point of the gravity-type accelerometer shifts.

Thus, wheel behavior control of the vehicle can be correctly applied in both forward and reverse directions of vehicle travel.

It will be obvious that the invention thus described may be varied in many ways. Such variations are not to be regarded as a departure from the spirit and scope of the invention, and all such modifications, as would be obvious to one skilled in the art are intended to be included within the scope of the invention as recited in the following claims.

What is claimed is:

1. A vehicle travel direction estimating device for repeatedly estimating a travel direction of a vehicle, comprising:

wheel speed calculation means for measuring a rotational velocity of a wheel of said vehicle and for producing an absolute value of said rotational velocity as a wheel speed of said wheel during each repeated estimating;

estimated vehicle acceleration calculation means for calculating an estimated vehicle acceleration Aw as a function of said wheel speed;

gravity-type accelerometer for producing a gravitationally detected acceleration Am;

first differentiating means for differentiating said gravitationally detected acceleration Am and for producing a first differential value Dam;

second differentiating means for differentiating said estimated vehicle acceleration Aw and for producing a second differential value Daw;

detection means for detecting said travel direction of said vehicle based on said first and second differential values Dam and Daw; and means for controlling a braking of said vehicle in response to said detected travel direction of said vehicle.

2. A vehicle travel direction estimating device according to claim 1, wherein said detection means detects said direction of travel to be a forward direction when signs of said first and second differential values are the same, and to be a reverse direction when said signs of said first and second differential values differ.

3. A vehicle travel direction estimating device according to claim 2, wherein said detection means comprises means for obtaining a certainty value Z, an absolute value of said value Z representing a certainty of a determination and a sign of said value Z representing said vehicle travel direction, said certainty value Z being obtained from a contour line on a map of which vertical and horizontal axes represent said first and second differential values Dam and Daw, respectively.

4. A vehicle travel direction estimating device according to claim 2, wherein said detection means comprises means for obtaining a certainty value Z, an absolute value of said value Z representing a certainty of a determination and a sign of said value Z representing said vehicle travel direction, said certainty value Z being obtained at each repeated estimation of said travel direction of said vehicle, and filtering means for producing a smoothed certainty value Zf by exponentially filtering said value Z.

5. A vehicle travel direction estimating device according to claim 1, further comprising:
   means for producing an adjustment speed kf assuming a forward direction of travel and for producing an adjustment speed kb assuming a reverse direction of travel;
   means for producing, assuming a forward direction of travel, a corrected acceleration Acf based on said gravity-type accelerometer by correcting said gravitationally detected acceleration Am by a correction amount Aof;
   means for producing, assuming a forward direction of travel, said correction amount Aof in a current estimation of said travel direction of said vehicle in which a previously produced correction amount Aof obtained in a previous estimation of said travel direction of said vehicle is adjusted as a function of a value which is a difference between said corrected acceleration Acf and said estimated vehicle acceleration Aw modified by said adjustment speed kf;
   means for producing, assuming a reverse direction of travel, a corrected acceleration Acb based on said gravity-type accelerometer by correcting said gravitationally detected acceleration Am by a correction amount Aob;
   means for producing, assuming a reverse direction of travel, said correction amount Aob in said current estimation of said vehicle travel direction in which a previously produced correction amount Aob obtained in said previous estimation of said vehicle travel direction is adjusted as a function of a value which is a difference between said corrected acceleration Acb and said estimated vehicle acceleration Aw modified by said adjustment speed kb; and
   means for selecting one of said corrected accelerations Acf and Acb according to said vehicle travel direction detected by said detection means.

6. A vehicle travel direction estimating device according to claim 1, further comprising:
   means for producing an adjustment speed k assuming a direction of travel detected by said detection means;
   means for producing, assuming a forward direction of travel when a forward direction is detected by said detection means, a correcting acceleration Ac based on said gravity-type accelerometer by correcting said gravitationally detected acceleration Am by a correction amount Ao;
   means for producing, assuming a forward direction of travel when a forward direction is detected by said detection means, said correction amount Ao in a current estimation of said vehicle travel direction in which said correction amount Ao obtained in a previous estimation of said vehicle travel direction is adjusted as a function of a value which is a difference between said corrected acceleration Ac and said estimated vehicle acceleration Aw modified by said adjustment speed k;
   means for producing, assuming a reverse direction of travel when a reverse direction is detected by said detection means, a corrected acceleration Ac based on said gravity-type accelerometer by correcting said gravitationally detected acceleration Am by a correction amount Ao; and
   means for producing, assuming a reverse direction of travel when a reverse direction is detected by said detection means, said correction amount Ao in the current estimation of said vehicle travel direction in which said correction amount Ao obtained in said previous estimation of said vehicle travel direction is adjusted as a function of a value which is a difference between said corrected acceleration Ac and said estimated vehicle acceleration Aw modified by said adjustment speed k.

7. A vehicle travel direction estimating device for repeatedly estimating a travel direction of a vehicle, comprising:
   wheel speed calculation means for measuring a rotational velocity of a wheel of said vehicle and for producing an absolute value of said rotational velocity as a wheel speed of said wheel during each repeated estimation of said vehicle travel direction;
   estimated vehicle acceleration calculation means for calculating an estimated vehicle acceleration Aw as a function of said wheel speed;
   gravity-type accelerometer for producing a gravitationally detected acceleration Am;
   first differentiating means for differentiating said gravitationally detected acceleration Am and for producing a first differential value Dam;
   second differentiating means for differentiating said estimated vehicle acceleration Aw and for producing a second differential value Daw; and
   detection means for detecting said travel direction of said vehicle based on said first and second differential values Dam and Daw, said detection means further comprising:
      means for fixing said detected vehicle travel direction until said vehicle stops moving, when a level of certainty of detection reaches a predetermined level; and
      means for clearing said fixed detected vehicle travel direction when said vehicle restarts moving after being stopped and for resuming said detection from a cleared state.

8. A system having an apparatus for estimating a travel direction of a vehicle having a plurality of wheels, said apparatus comprising:
   means for determining an estimated acceleration signal representative of an acceleration of said vehicle as a function of a rotational speed of at least one wheel of said vehicle;
   means for producing an independent acceleration signal which is representative of said acceleration of said vehicle, and for determining said independent acceleration signal independently of the speeds of said plurality of wheels of said vehicle;
   first means for differentiating said independent acceleration signal and for producing a first differential value;
   second means for differentiating said estimated acceleration signal and for producing a second differential value;
   detection means for detecting said vehicle travel direction base on said first and second differential values; and
   means for controlling a braking of said vehicle in response to said detected vehicle travel direction.

9. The system according to claim 8, said determining means comprising:

means for measuring a speed of said vehicle as a function of said rotational speed of said at least one wheel of said vehicle; and means for estimating said acceleration of said vehicle as a function of said measured speed and for producing said estimated acceleration signal.

10. The system according to claim 8, said detection means comprising means for determining that said vehicle is traveling in a forward direction when polarities of said first and second differential values are the same, and that said vehicle is traveling in a reverse direction when said polarities of said first and second differential values are different.

11. The system according to claim 10, said apparatus further comprising means for estimating a certainty of the determination made by the determining means as a function of the magnitudes of the respective first and second differential values.

12. The system according to claim 11, said apparatus further comprising means for assigning a numerical value representative of both the determined direction of travel and the estimated certainty of the determination made by the determining means.

13. The system according to claim 12, wherein said numerical value comprises a real number, the polarity of the real number representing the determined direction of travel and the magnitude of the real number representing the estimated certainty of the determination made by the determining means.

14. The system according to claim 13, wherein said real number comprises an integer value.

15. The system according to claim 13, said apparatus further comprising means for smoothing the estimated certainty value.

16. The system according to claim 15, wherein said smoothing means comprises means for exponentially filtering the estimated certainty value.

17. The system according to claim 11, said apparatus further comprising means for adjusting a zero point of said independent acceleration signal producing means as a function of the determined travel direction of the vehicle.

18. The system according to claim 13, said apparatus further comprising:

means for producing a fixed indication of said direction of travel of said vehicle when the level of certainty of the detection reaches a predetermined level; and means for clearing said indication when the vehicle stops.

19. The system according to claim 8, wherein said independent acceleration signal producing means comprises a gravity-type accelerometer and said independent acceleration signal comprises a gravitationally detected acceleration signal.

20. The system according to claim 9, wherein said speed measuring means comprises a plurality of wheel speed sensors for producing signals corresponding to respective wheels of the vehicle.

21. A system having an apparatus for estimating a travel direction of a vehicle having a plurality of wheels, said apparatus comprising:

means for determining an estimated acceleration signal representative of an acceleration of said vehicle as a function of a rotational speed of at least one wheel of said vehicle, said determining means comprising:

means for measuring the speed of the vehicle as a function of the rotational speed of said at least one wheel of said vehicle; and means for estimating the acceleration of the vehicle as a function of the measured speed and for producing said estimated acceleration signal;

means for producing an independent acceleration signal which is representative of said acceleration of said vehicle, and for determining said independent acceleration signal independently of the speeds of said plurality of wheels of said vehicle;

first means for differentiating said independent acceleration signal and for producing a first differential value;

second means for differentiating said estimated acceleration signal and for producing a second differential value;

detection means for detecting said vehicle travel direction based on said first and second differential values, wherein an antilock brake control device utilizes said travel direction estimating apparatus to operate a plurality of brake actuating devices to control an amount of braking pressure to a wheel of said vehicle.

22. A process having a method for estimating a travel direction of a vehicle which having a plurality of wheels, the method comprising:

determining an estimated acceleration signal representative of an acceleration of the vehicle as a function of a rotational speed of at least one wheel of the vehicle;

producing an independent acceleration signal which is representative of the acceleration of the vehicle, by determining the independent acceleration signal independently of the speed of the at least one wheel of the vehicle;

differentiating the independent acceleration signal and producing a first differential value;

differentiating the estimated acceleration signal and producing a second differential value;

detecting the direction of vehicle travel based on the first and second differential values; and controlling a braking of the vehicle in response to the detected vehicle direction.

23. The process according to claim 22, said step of determining comprising:

measuring a speed of the vehicle as a function of the rotational speed of the at least one wheel of the vehicle; and estimating the acceleration of the vehicle as a function of the measured speed and producing the estimated acceleration signal.

24. The process according to claim 22, said detecting step comprising determining that the vehicle is traveling in a forward direction when the polarities of the first and second differential values are the same, and that the vehicle is traveling in a reverse direction when the polarities of the first and second differential values are different.

25. The process according to claim 24, said method further comprising estimating the certainty of the determination made in the determining step as a function of the magnitudes of the respective first and second differential values.

26. The process according to claim 25, said method further comprising assigning a numerical value representative of both the determined direction of travel and the estimated certainty of the determination made by the determining step.

27. The process according to claim 26, wherein said numerical value comprises a real number, the polarity of the real number representing the determined direction of travel and the magnitude of the real number representing the estimated certainty of the determination made by the determining step.

28. The process according to claim 27, wherein said real number comprises an integer value.

29. The process according to claim 27, said method further comprising smoothing the estimated certainty value.

30. The process according to claim 29, wherein said smoothing step comprises exponentially filtering the estimated certainty value.

31. The process according to claim 25, said method further comprising adjusting a zero point of an independent acceleration signal production device as a function of the determined travel direction of the vehicle.

32. The process according to claim 27, said method further comprising:
producing a fixed indication of said direction of travel of said vehicle when the level of certainty of the detection step reaches a predetermined level; and
clearing said indication when the vehicle stops.

33. The process according to claim 22, wherein said independent acceleration signal producing step comprises producing a gravitationally detected acceleration signal with a gravity-type accelerometer.

34. The process according to claim 23, wherein said speed measuring step comprises producing a plurality of signals with a plurality of wheel speed sensors, said signals corresponding to respective wheels of the vehicle.

35. A method for estimating a travel direction of a vehicle having a plurality of wheels, said method comprising:
determining an estimated acceleration signal representative of an acceleration of the vehicle as a function of a rotational speed of at least one wheel of the vehicle, the determining step comprising:
measuring a speed of the vehicle as a function of the rotational speed of the at least one wheel of the vehicle; and
estimating the acceleration of the vehicle as a function of the measured speed and producing the estimated acceleration signal;
producing an independent acceleration signal which is representative of the acceleration of the vehicle, by determining the independent acceleration signal independently of the speed of the at least one wheel of the vehicle;
differentiating the independent acceleration signal and producing a first differential value;
differentiating the estimated acceleration signal and producing a second differential value;
detecting the direction of vehicle travel based on the first and second differential values; and
controlling an amount of brake pressure to each wheel of the vehicle in accordance with the estimated acceleration of the vehicle to perform an antilock brake control on the vehicle.

* * * * *

UNITED STATES PATENT AND TRADEMARK OFFICE
CERTIFICATE OF CORRECTION

PATENT NO. : 5,267,166
DATED : November 30, 1993
INVENTOR(S) : K. TAKATA et al.

It is certified that error appears in the above-indentified patent and that said Letters Patent is hereby corrected as shown below:

On the title page, item [56]:
under "U.S. PATENT DOCUMENTS", add ---4,850,446  7/89 Leiber, et al.---.

On the cover of the printed patent, section [56], under "FOREIGN PATENT DOCUMENTS", add the following:

---3728572     3/89 Germany
   0078655     5/83 E.P.O.
   3705983     9/87 Germany---.

At column 1, line 15 of the printed patent, change "Antilocks" to ---Antilock---.

At column 8, line 16 of the printed patent, insert ---,--- after "art".

Signed and Sealed this

Fifth Day of November, 1996

Attest:

BRUCE LEHMAN

*Attesting Officer*  *Commissioner of Patents and Trademarks*